US009282144B2

(12) United States Patent
Tebay et al.

(10) Patent No.: US 9,282,144 B2
(45) Date of Patent: Mar. 8, 2016

(54) UNMANNED VEHICLE SELECTIVE DATA TRANSFER SYSTEM AND METHOD THEREOF

(75) Inventors: Andrew Christopher Tebay, Kendal (GB); Simon Graham Stockton, Carnforth (GB)

(73) Assignee: BAE SYSTEMS PLC, London (GB)

( * ) Notice: Subject to any disclaimer, the term of this patent is extended or adjusted under 35 U.S.C. 154(b) by 322 days.

(21) Appl. No.: 13/979,499

(22) PCT Filed: Jan. 10, 2012

(86) PCT No.: PCT/GB2012/050043
§ 371 (c)(1),
(2), (4) Date: Jul. 12, 2013

(87) PCT Pub. No.: WO2012/095658
PCT Pub. Date: Jul. 19, 2012

(65) Prior Publication Data
US 2013/0318214 A1 Nov. 28, 2013

(30) Foreign Application Priority Data

Jan. 14, 2011 (EP) .................................... 11275011
Jan. 14, 2011 (GB) .................................. 1100565.9

(51) Int. Cl.
G06F 15/16 (2006.01)
H04L 29/08 (2006.01)
G06F 3/06 (2006.01)

(52) U.S. Cl.
CPC ................ *H04L 67/10* (2013.01); *H04L 67/06* (2013.01); *H04L 67/12* (2013.01); *H04L 67/125* (2013.01);
(Continued)

(58) Field of Classification Search
CPC ......... H04L 67/06; H04L 67/10; H04L 67/12; H04L 67/125
USPC ........... 709/217–219; 701/409, 468, 514, 517
See application file for complete search history.

(56) References Cited

U.S. PATENT DOCUMENTS 5,457,629 A 10/1995 Miller et al.
6,449,540 B1 9/2002 Rayner
(Continued)

FOREIGN PATENT DOCUMENTS

GB 2 222 338 A 2/1990
WO WO 2010/127351 A1 11/2010

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Jul. 25, 2013, in the corresponding International Application No. PCT/GB2012/050043. (10 pages).
(Continued)

*Primary Examiner* — Bharat N Barot
(74) *Attorney, Agent, or Firm* — Maine Cernota & Rardin

(57) ABSTRACT

A data transfer system is disclosed for an unmanned vehicle on a mission. The data transfer system can include a first sensor associated with the unmanned vehicle for collecting a first data set, and a second sensor associated with the unmanned vehicle and for collecting a second data set, wherein the second data set is associated with the first data set by a predetermined association. A transceiver can transmit data from the unmanned vehicle to a remote data storage system. A mass data storage computer located on the unmanned vehicle can store the first and second data sets based on the predetermined association, and execute requests from the remote data storage system to transmit the first data set from the unmanned vehicle to the remote data storage system, and to transmit selected ones of the second data set from the unmanned vehicle to the remote data storage system.

20 Claims, 8 Drawing Sheets

(52) U.S. Cl.
CPC ..... *B64C 2201/122* (2013.01); *B64C 2201/123* (2013.01); *G06F 3/0601* (2013.01); *G06F 3/0605* (2013.01); *G06F 3/067* (2013.01); *G06F 3/0658* (2013.01); *G06F 3/0673* (2013.01); *G06F 2003/0697* (2013.01)

(56) References Cited

U.S. PATENT DOCUMENTS

| | | | | |
|---|---|---|---|---|
| 6,510,381 | B2 * | 1/2003 | Grounds | G01S 5/0027 |
| | | | | 701/517 |
| 7,415,331 | B2 * | 8/2008 | Dapp | G01C 21/12 |
| | | | | 701/117 |
| 8,195,343 | B2 * | 6/2012 | Lin | G01S 19/49 |
| | | | | 701/522 |
| 8,527,445 | B2 * | 9/2013 | Karins | G06N 7/005 |
| | | | | 706/16 |
| 2005/0080606 | A1 | 4/2005 | Ampunan et al. | |
| 2009/0219393 | A1 | 9/2009 | Vian et al. | |
| 2010/0023185 | A1 * | 1/2010 | Terwelp | G01S 17/023 |
| | | | | 701/467 |
| 2010/0023206 | A1 | 1/2010 | Paquette et al. | |
| 2010/0277588 | A1 | 11/2010 | Ellsworth et al. | |
| 2013/0018575 | A1 * | 1/2013 | Birken et al. | 701/409 |
| 2014/0336928 | A1 * | 11/2014 | Scott | 701/468 |

OTHER PUBLICATIONS

International Search Report (PCT/ISA/210) issued on Feb. 15, 2012, by the European Patent Office as the International Searching Authority for International Application No. PCT/GB2012/050043.
European Search Report issued on May 25, 2011.
United Kingdom Search Report issued on Apr. 21, 2011.

* cited by examiner

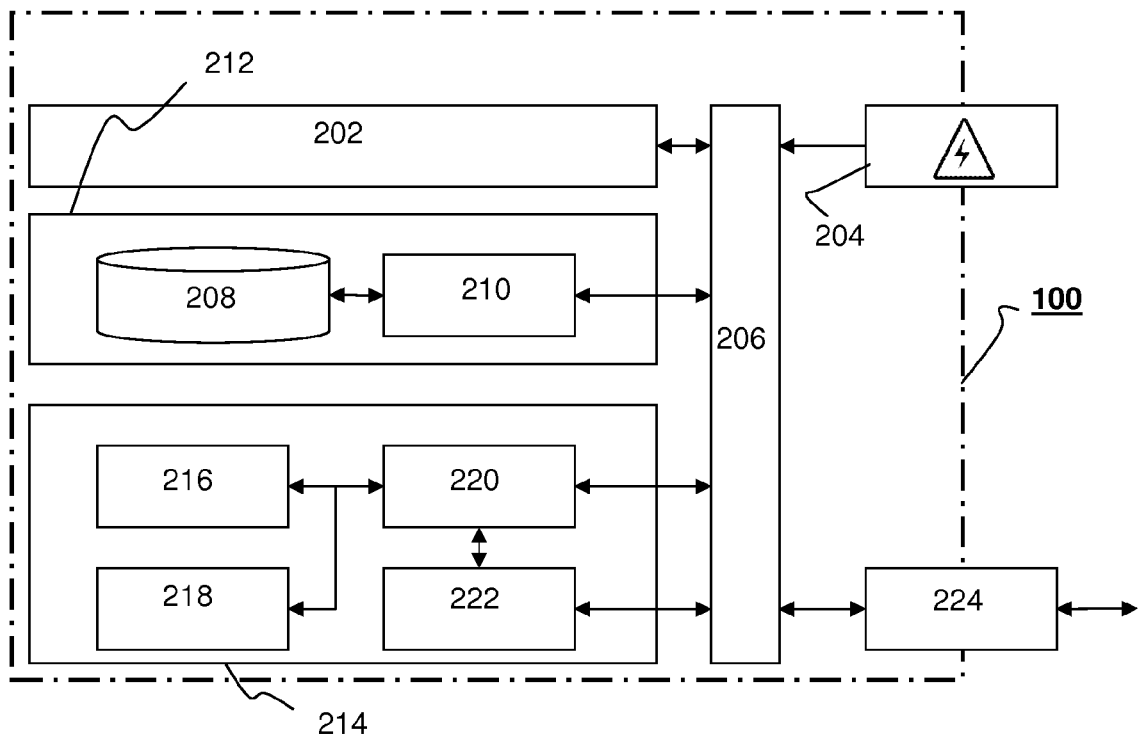
FIG. 2-A
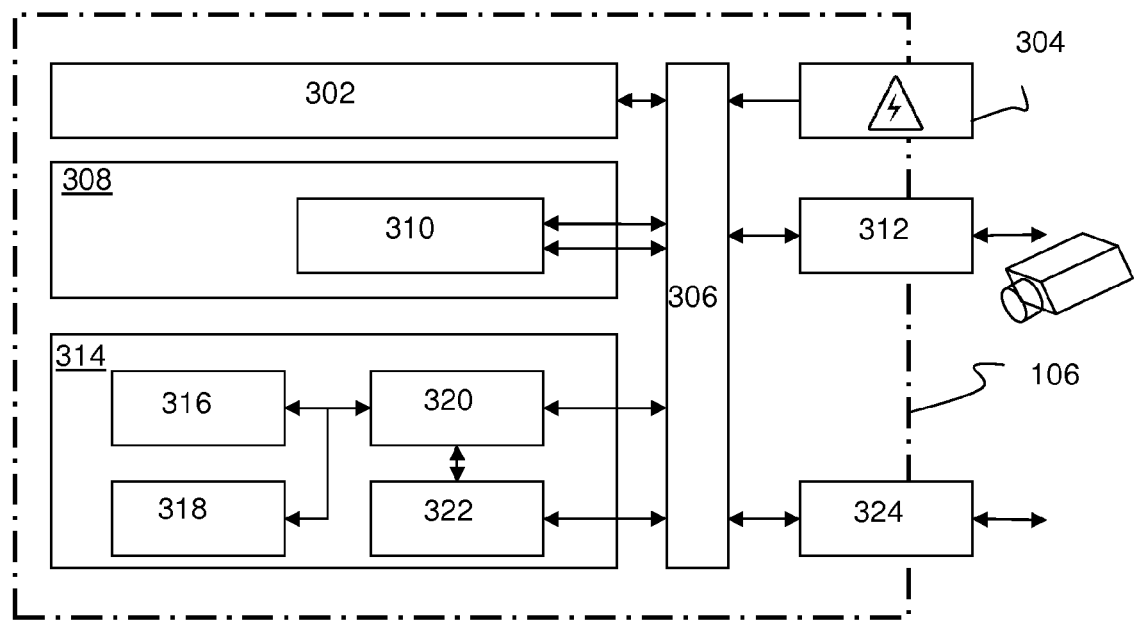
FIG. 2-B

UNMANNED VEHICLE SELECTIVE DATA TRANSFER SYSTEM AND METHOD THEREOF

RELATED APPLICATIONS

This application is a national phase application filed under 35 USC §371 of PCT Application No. PCT/GB 2012/050043 with an International filing date of 10 Jan. 2012 which claims priority of GB Patent Application 1100565.9 filed 14 Jan. 2011 and EP Patent Application 11275011.2 filed 14 Jan. 2011. Each of these applications is herein incorporated by reference in their entirety for all purposes.

The present invention relates to a data transfer system and in particular to a data transfer system for an unmanned aerial vehicle (UAV). The present invention also relates to a method of extracting data from an unmanned aerial vehicle.

INTRODUCTION

Autonomous vehicles such as unmanned air vehicles (UAV) or unmanned ground vehicles (UGV) are increasingly used in military applications, but are also used in a small but growing number of civil applications such as non-military security work, police forces, surveillance of pipelines in the oil and gas industry, traffic control and search and rescue missions. UAVs are reusable, uncrewed or unmanned vehicles capable of controlled, sustained and level flight, and are usually powered by a jet or a reciprocating engine. Currently, the largest use of UAVs is in military applications such as reconnaissance, i.e. preliminary or exploratory military surveys, as well as attack missions. UAVs may fulfill other functions including remote sensing which is central to the reconnaissance role of a UAV. Less common UAV functions may include interaction and transport missions.

UAV remote sensing functions may be carried out using electromagnetic spectrum sensors, biological sensors and/or chemical sensors. These electromagnetic sensors typically use visual spectrum, infrared, or near infrared cameras as well as radar systems. Other electromagnetic wave detectors, such as microwave and ultraviolet spectrum sensors, may also be used, but are less common.

In a typical reconnaissance mission, a UAV may capture images or video using a camera. Each of the images may be accompanied by specific data relating to the current position and attitude of the vehicle (i.e. pitch, roll and heading angles of the vehicle), the position and attitude of the camera relative to the vehicle, as well as predetermined installation angles of the camera (i.e. pitch, roll and heading of the camera relative to the vehicle) and the properties of the camera and the lens. The specific data is referred to as geolocated image footprints and may further include the latitude, longitude and altitude of the area captured at the four corners of the image. This data makes it possible to determine the location of each pixel in the image. As a result, a substantial amount of data is generated for each of the images and respective geolocated image footprints, wherein the size of the image data itself may be 99.9% and the size of the image footprint may be 0.1% of the total data size. Typically, the acquired image data is stored in a data storage device on board the UAV, wherein the data storage device may be a simple disk drive or a small, removable solid state flash memory card. After a mission (post sortie) and once the UAV has landed, the data can be extracted from the removable solid state flash memory cards by inserting the cards into dedicated ground equipment for download. However, typically flash memory cards have limited capacity and the memory card access is relatively slow thus making flash memory card data storage unsuitable for the large amounts of data required for the geolocated images.

The data may also be downloaded after an operational flight by a military aircraft via a physical connection between the data storage device of the UAV and a ground control station (GCS). Due to the large amounts of data the download can take several hours and requires the aircraft to be powered and parked near the ground control station (GCS). This can cause delays in the turnaround and servicing of the aircraft, potentially blocking the taxiway and using unnecessary amounts of fuel while cooling the aircraft during taxiing and download of the data. Military intelligence may be affected due to any delay in receiving critical data, which may only be provided after the return of the UAV and download of the data.

Accordingly, it would be desirable to eliminate one or more of the above problems by providing a data transfer system that provides immediate access to at least part of the stored data and which minimizes the time required to transfer the data from a UAV to a ground control station (GCS).

SUMMARY OF THE INVENTION

According to a first aspect of the present invention, there is provided a data transfer system for an unmanned vehicle on a mission, the data transfer system comprising:
  a first sensor associated with the unmanned vehicle and which collects a first data set;
  a second sensor associated with the unmanned vehicle and which collects a second data set, wherein the second data set is associated with the first data set by a predetermined association;
  a transceiver for transmitting data from the unmanned vehicle to a remote data storage system;
  a mass data storage computer located on the unmanned vehicle which stores the first and second data sets based on the predetermined association;
  wherein the mass data storage computer receives and executes requests from the remote data storage system to transmit the first data set from the unmanned vehicle to the remote data storage system;
  wherein the mass data storage computer receives and executes requests from said remote data storage system to transmit selected ones of the second data set from the unmanned vehicle to the remote data storage system; and
  wherein the mass data storage computer is removably connectable to the unmanned vehicle such that at the end of the mission the mass data storage computer can be removed from the unmanned vehicle and connected to the remote data storage device to download any data which has not already been transmitted.

This provides the advantage that important and critical data can be provided to a remote data storage system at a remote ground control station (GCS) while the vehicle is still carrying out its mission. Furthermore, the system of the present invention provides the advantage that a predetermined mission plan can be altered in response to the data received at the GCS, which significantly improves the effectiveness and efficiency of the vehicle. In addition, the removably connectable mass data storage computer of the system of the present invention provides the advantage that UAV preparation time for a new subsequent mission and data download time is minimised.

The transceiver may be adapted to provide a wireless data transfer link to the remote data storage system.

This provides the advantage that data can be transferred to a remote data storage system without the need for a physical connection from any location.

The predetermined association may be based on a uniquely assigned tag.

The predetermined association may be chronological such as based on a time stamp.

This provides the advantage that each one of the captured images can be allocated to its corresponding geolocated footprint, i.e. GPS data, vehicle, speed, orientation, altitude etc, via a distinct chronological marker provided by a timer or clock or a uniquely assigned tag, for example a name tag that is the same for the associated image and footprint.

The mass data storage computer may comprise a physical interface connector adapted to connect to both the unmanned vehicle and the remote data storage system.

This provides the advantage that, after returning from a mission, the mass data storage computer can be removed and physically connected to the remote data storage computer of the ground control station where accumulated data can be extracted at a maximum speed via the physical connection. Thus minimising the time required to download the data from the unmanned vehicle to the data storage system at the ground control station.

The mass data storage computer may compress the first data set and/or the selected ones of the second data set prior to transmission via the transceiver.

This provides the advantage that the data size is minimized prior to transmission via the transceiver, thus, further improving throughput.

The first data set may comprise geolocated data and the second data set may comprise imaging data. The geolocated data may comprise real-time tracking data of the unmanned vehicle and the orientation of the second sensor with respect to the unmanned vehicle.

This provides the advantage that each of the captured images can be allocated to an exact location including essential data about the vehicles orientation and movement within a defined space.

The first sensor may comprise a global positioning system and/or an inertial navigation system. The second sensor may comprise a camera adapted to capture images and/or video.

According to a second aspect of the present invention, there is provided a method of extracting data from the data transfer system previously described, comprising the steps of:
 (i) receiving a first data set and a second data set and associating the second data set to the first data set according to a predetermined association;
 (ii) storing the first data set and the associated second data set in a mass data storage computer;
 (iii) receiving and executing requests from a remote data storage system and transmitting the first data set to the remote data storage system via the transceiver;
 (iv) receiving and executing requests from the remote data storage system and transmitting selected ones of the second data set to the remote data storage system via the transceiver;
 (v) at the end of the mission, removing the mass data storage computer from the unmanned vehicle and connecting the mass data storage computer to the remote data storage system via a physical interface connection and downloading any data which has not already been transmitted.

The method may further comprise the step of connecting a second, formatted mass data storage computer to the unmanned vehicle in the place of the removed mass data storage computer.

This provides the advantage that a mass data storage computer can be pre-prepared for a subsequent mission of a UAV and readily provided to the UAV as soon as it returns from its previous mission, therefore, minimizing the time required for preparing the UAV for its next mission.

According to a third aspect of the present invention, there is provided a computer readable storage medium storing a program of instructions to a computer, wherein the instructions are adapted to execute the method previously described.

According to a fourth aspect of the invention, there is provided a system, method and software readable medium according to any one of the figures.

BRIEF DESCRIPTION OF THE DRAWINGS

A preferred embodiment of the present invention will now be described, by way of example, with reference to the accompanying drawings, in which:

FIG. 2a shows a schematic illustration of the mass data storage computer of the data transfer system of FIG. 1;

FIG. 2b shows a schematic illustration of a signal concentrator of the data transfer system of FIG. 1;

DETAILED DESCRIPTION OF EMBODIMENTS

On-Board Architecture

Figure 1:
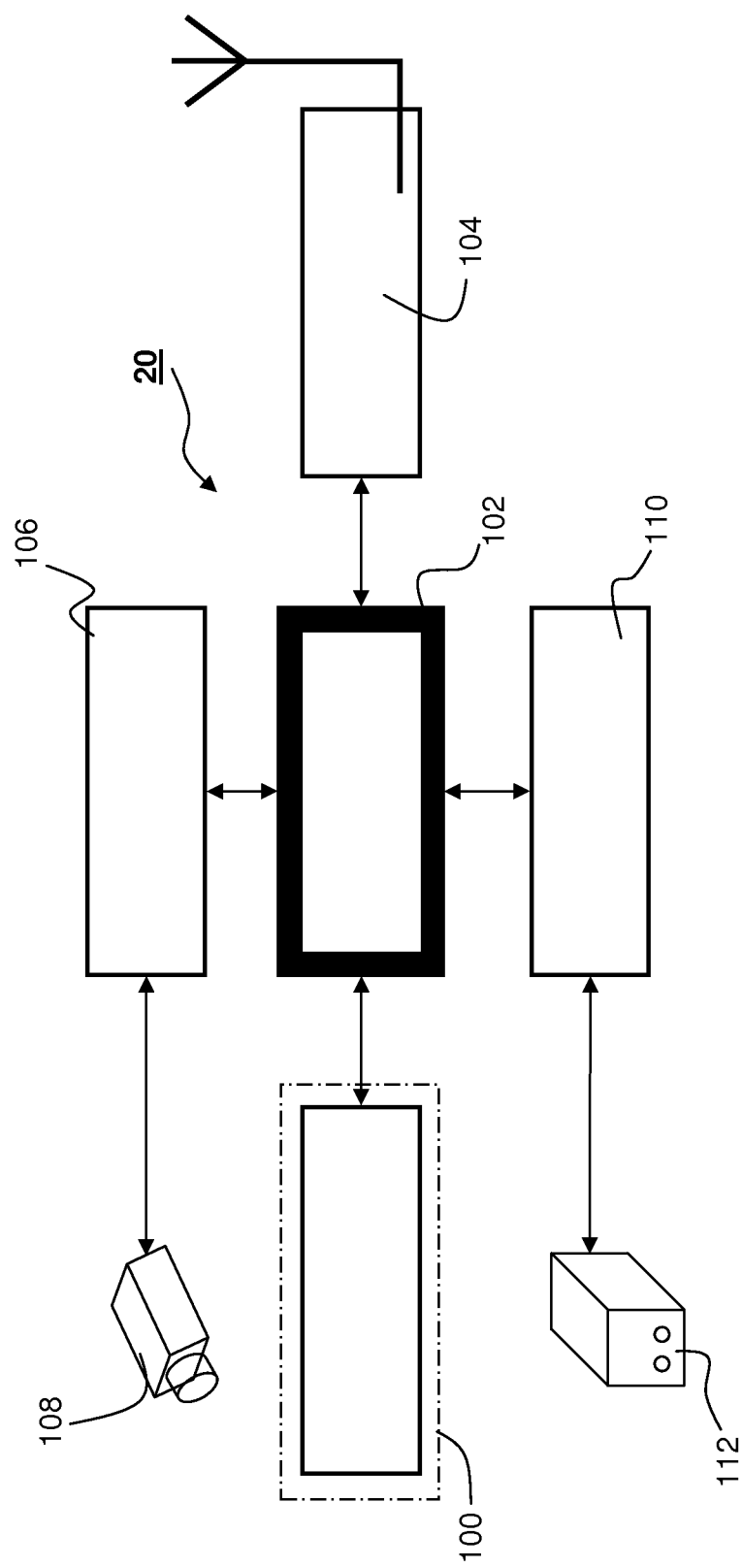
FIG. 1 shows a schematic illustration of an overview of the UAV data transfer system architecture, in accordance with an embodiment of the present invention.

In use and on-board the UAV 10, the mass data storage computer 100 is removably connected to the data transfer system 20 of the UAV 10 via a network switch 102. The network switch 102 forms a central part of the data transfer system 20 for interaction between the mass data storage computer 100 and any other peripheral system. The mass data storage computer 100 is mounted within the UAV 10 such that it can be easily removed from the data transfer system 20 without the need for tools. The UAV 10 is adapted to provide the required power and sufficient cooling for the on-board equipment, including the mass data storage computer 100. FIG. 1 shows a simplified example of the system architecture of the data transfer system 20 on-board the UAV 10 and the removable mass data storage computer 100. Typically, the data transfer system 20 comprises a wireless transceiver 104, a first signal concentrator 106 connected to at least one camera 108 by a camera specific interface. The signal concentrator 106 is capable of receiving signals of different standards and "concentrates" the signals in to a common interface that is supported by the rest of the data transfer system 20. In this particular example, the signal concentrator 106 takes in 'CameraLink' to interface with the cameras 108 and MIL-STD 1553 (interface standard) to interface with the LINS (Laser Inertia Navigation System) (not shown), and provides 'Ethernet' connection that is supported by the data transfer system 20. Also the data transfer system 20 includes a second signal concentrator 110 connected to the network switch 102 and suitable for connection with, for example, a GPS or inertial navigation system. The signal concentrators 106, 110 provide a specific interface for the camera 108, and the GPS and inertial navigation system 112 (GPS/INS) to the network switch 102. Also, both signal concentrators 106 and 110 could be amalgamated into a single signal concentrator that performs both camera and LINS interface functions.

Referring to FIG. 2(a), the mass data storage computer 100 may include a power supply unit 202 connected to a power connector 204 via a backplane 206. A solid state disk 208 and a serial advanced technology attachment (SATA) controller 210 are coupled to a solid state disk board 212 which is connected to the backplane 206. A single board computer 214 comprises a processor 216, a memory 218, a bridge 220 and a network controller 222, the latter two being connected to the backplane 206. The backplane 206 connects to a network connector 224 adapted to connect to the network switch 102 in FIG. 1. The mass data storage computer 100 is connected to the first signal concentrator 106 by the network switch 102 as disclosed in FIG. 1.

Referring to FIG. 2(b), the signal concentrator 106 may comprise a power supply unit 302 connected to a power connector 304 via a backplane 306. A camera interface board 308 includes a camera controller 310 which is connected to a camera connector 312 via the backplane 306. A single board computer 314 comprises a processor 316, a memory 318, a bridge 320 and a network controller 322, the latter two being connected to the backplane 306. A network connector 324 is the physical connector that carries the 'Ethernet' from the single board computer to the external shell of the box and is adapted to connect to the network switch 102 in FIG. 1.

Figure 3:
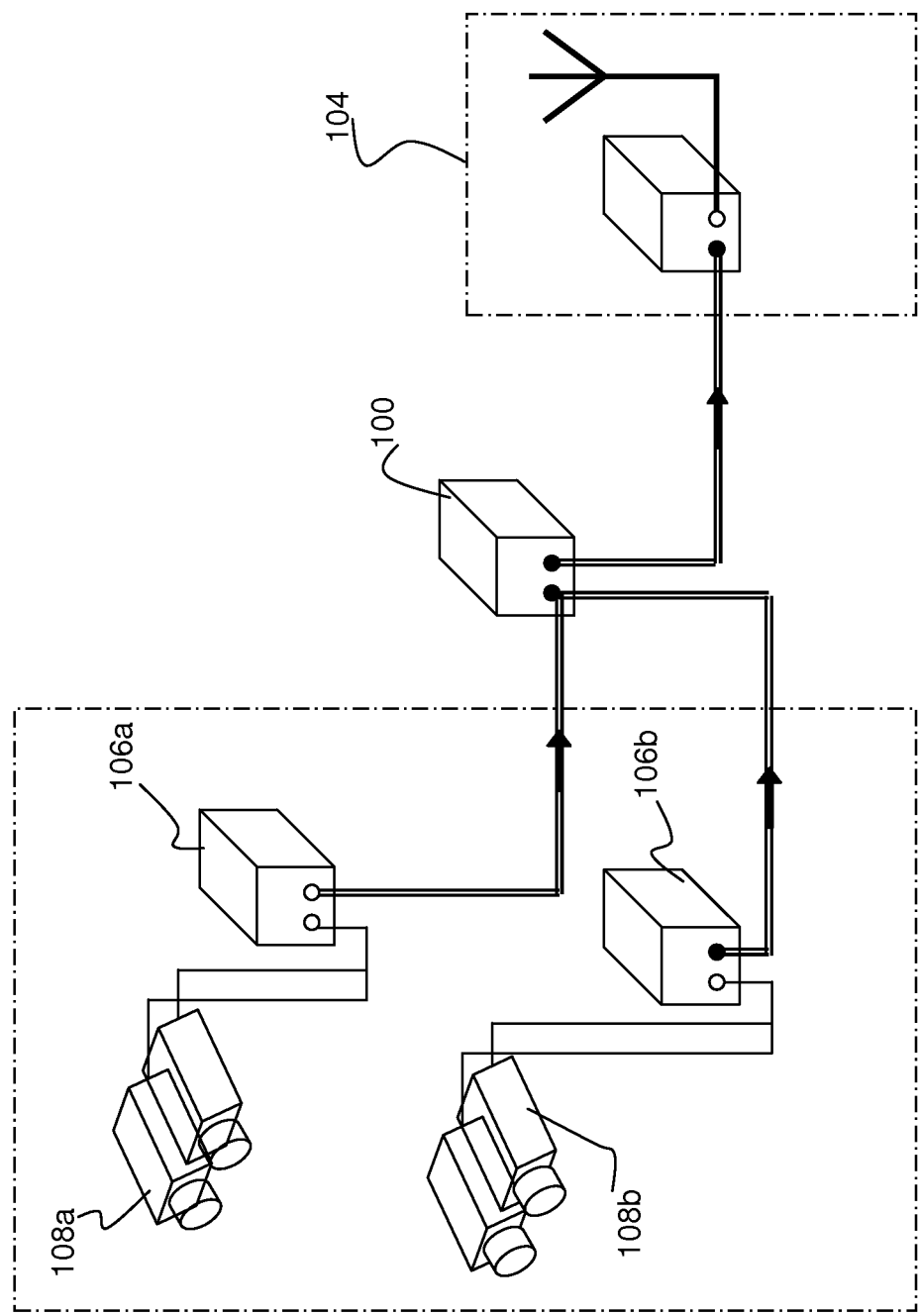
FIG. 3 shows a block diagram of the data transfer system of the present invention.

As shown in FIG. 3, the mass data storage computer 100 is in communication with a first and second camera 108a, 108b via respective first signal concentrators 106a and 106b. The mass data storage computer 100 also has access to the wireless transceiver 104 through which data can be transmitted to and received from a remote ground control station.

On-Board Operation

Figure 4:
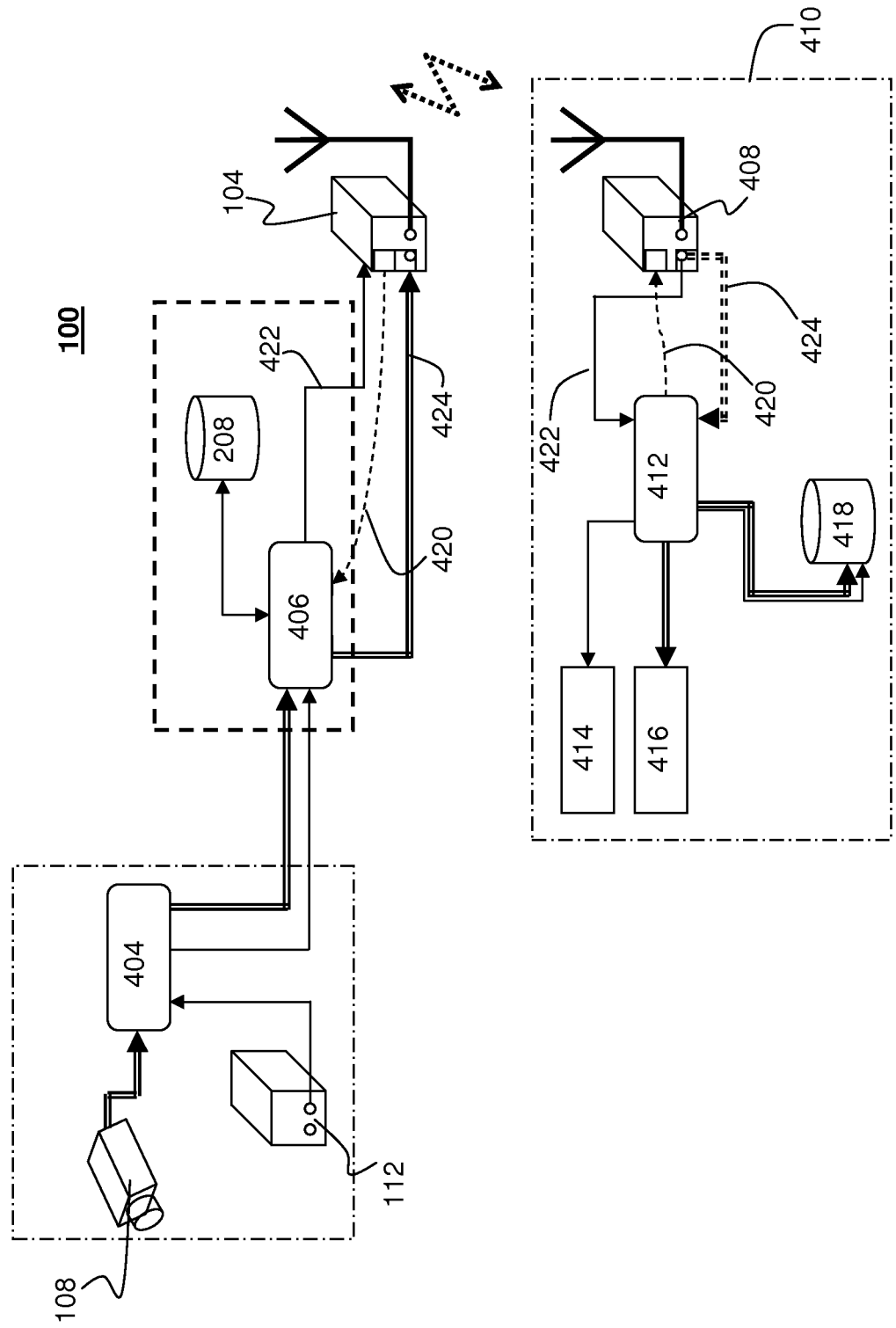
FIG. 4 shows an operational illustration of the data transfer system of the UAV communicating with a remote data storage system at a ground control station via a wireless data transfer link in accordance with an embodiment of the present invention.

The operation of a preferred embodiment of the invention will now be described with reference to FIG. 4. Whilst on a reconnaissance mission, images are captured from the camera 108 and each image is geolocated. The geolocated image footprint and the camera images are associated in a 1:1 relationship. For example, a footprint named 'footprint0001' may be directly associated to an image having a similar filename, e.g. 'image0001'. The footprint further contains a timestamp along with the other data required to geolocate the associated image. The geolocated image footprint is determined from the current vehicle position and altitude (e.g. pitch, roll and heading angles of the vehicle) derived from the GPS and inertial navigation system (GPS/INS) 112 and the known installation angles of the camera 108 (e.g. pitch, roll and heading of the camera 108 relative to the vehicle 10). The geolocated image footprint is then generated further containing, for example, latitude, longitude and altitude of the four corners of the area captured by each image. The footprint is then associated to its respective image through an image capture module 404. The image capture module 404 comprises software that manages the capture of the images. For example, the system takes a picture and records the data required to perform geolocation at the time the picture was taken, so that each image is accompanied by a file containing, inter alia, aircraft position and camera properties and position relative to the aircraft. The generated image data from the camera 108 and the geolocated image footprint is then sent to the store manager 406 of the mass data storage computer 100 to be stored in an uncompressed state onto the internal storage, such as a solid state disk 208. This helps to preserve the original quality of image.

The geolocated image footprints 422 of all images captured thus far are then transmitted to an image manager 412 via the wireless transceiver 104 of the UAV 10 and the wireless transceiver 408 of the remote data storage system at the ground control station 410. The captured images are displayed on a map 414 to illustrate the images exact position and orientation. After review of the footprints, an operator can request a wireless download of specific images pre-selected from the mapped geolocated image footprints. A request 420 is sent via the wireless transceivers 408, 104 to the store manager 406, which retrieves the requested image data from the internal storage 208. The image data is then compressed to reduce the amount of data so that it is suitable for wireless transmission with the transceivers 408, 104. The compressed image data 424 is transmitted to the image manager 412 at the remote control station 410 via the wireless transceivers 104, 408. The data may be compressed by a JPEG2000 standard compression or any other suitable compression standard. The image manager 412 at the ground control station 410 decompresses the received compressed image data 424 and stores the decompressed image on a local data storage 418 where it is available for the image display 416 and/or map display 414. This method allows a fast and reliable transfer of specific images from a UAV 10 to a remote ground control station 410 so that critical information can be made available without having to return the UAV 10 to its ground control station. The critical information may also be used to generate alternative mission plans for the UAV 10, which is then transmitted from the ground control station via the wireless transceivers 408, 104. This helps to improve the quality of the captured data and maximises the efficiency of each mission.

Post-Sortie Data Extraction

Figure 5:
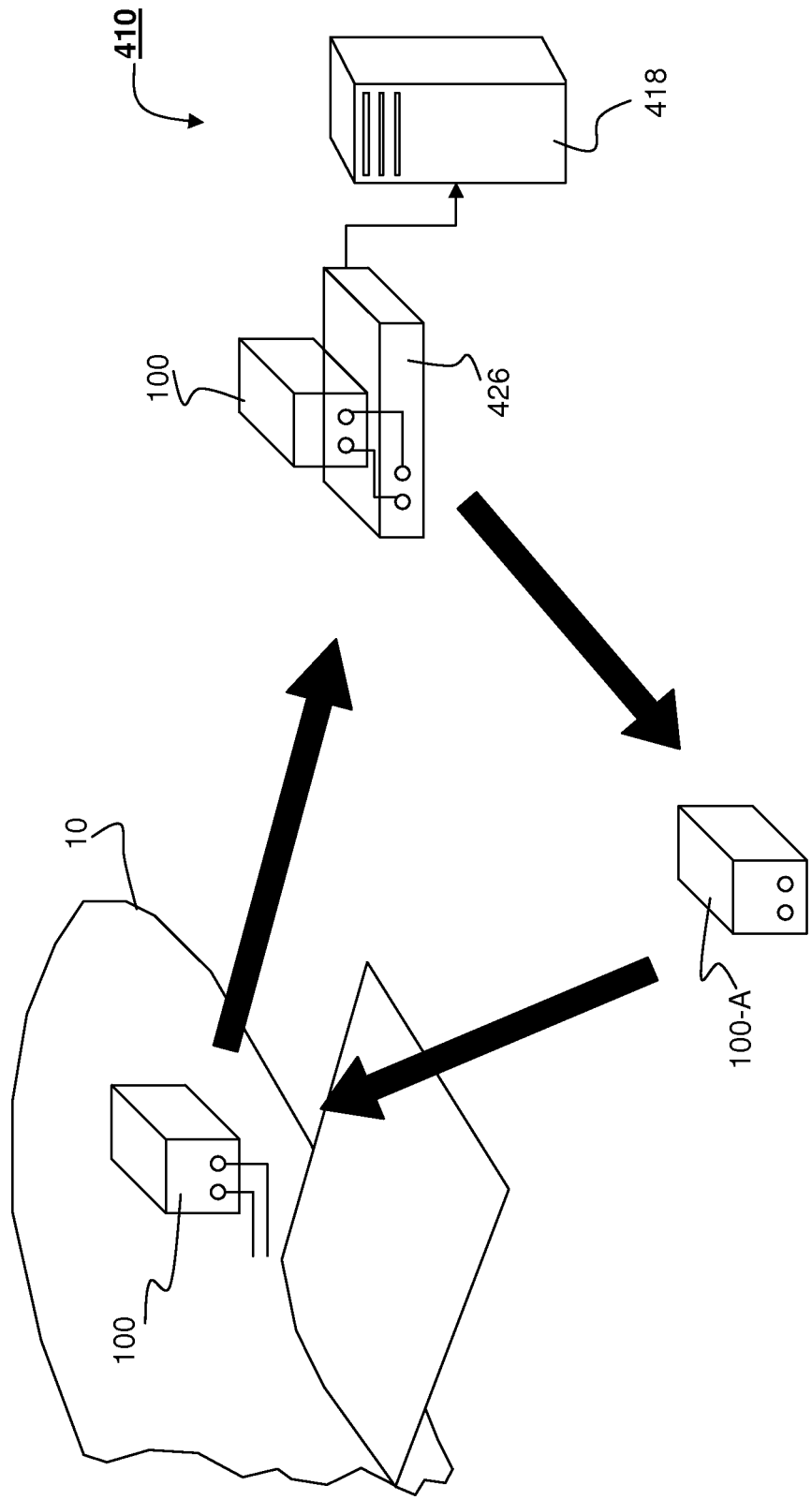
FIG. 5 shows a block diagram depicting the removal of the mass data storage computer from the data transfer system of the UAV and subsequent connection to a data cradle of a remote data storage system at a ground control station.
Figure 6:
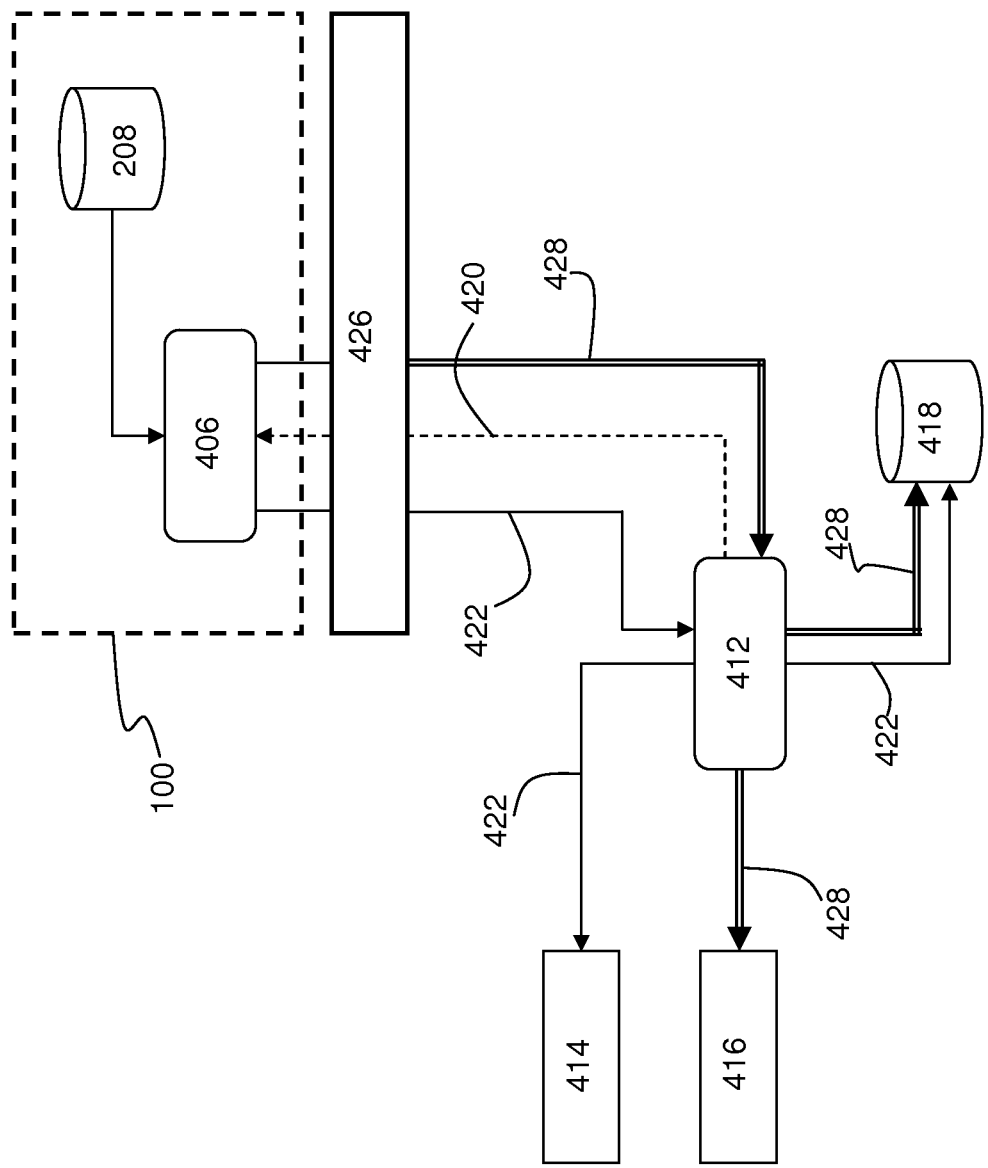
FIG. 6 shows a block diagram of the mass data storage computer connected to the data cradle of the remote data storage system at the ground control station.
Figure 7:
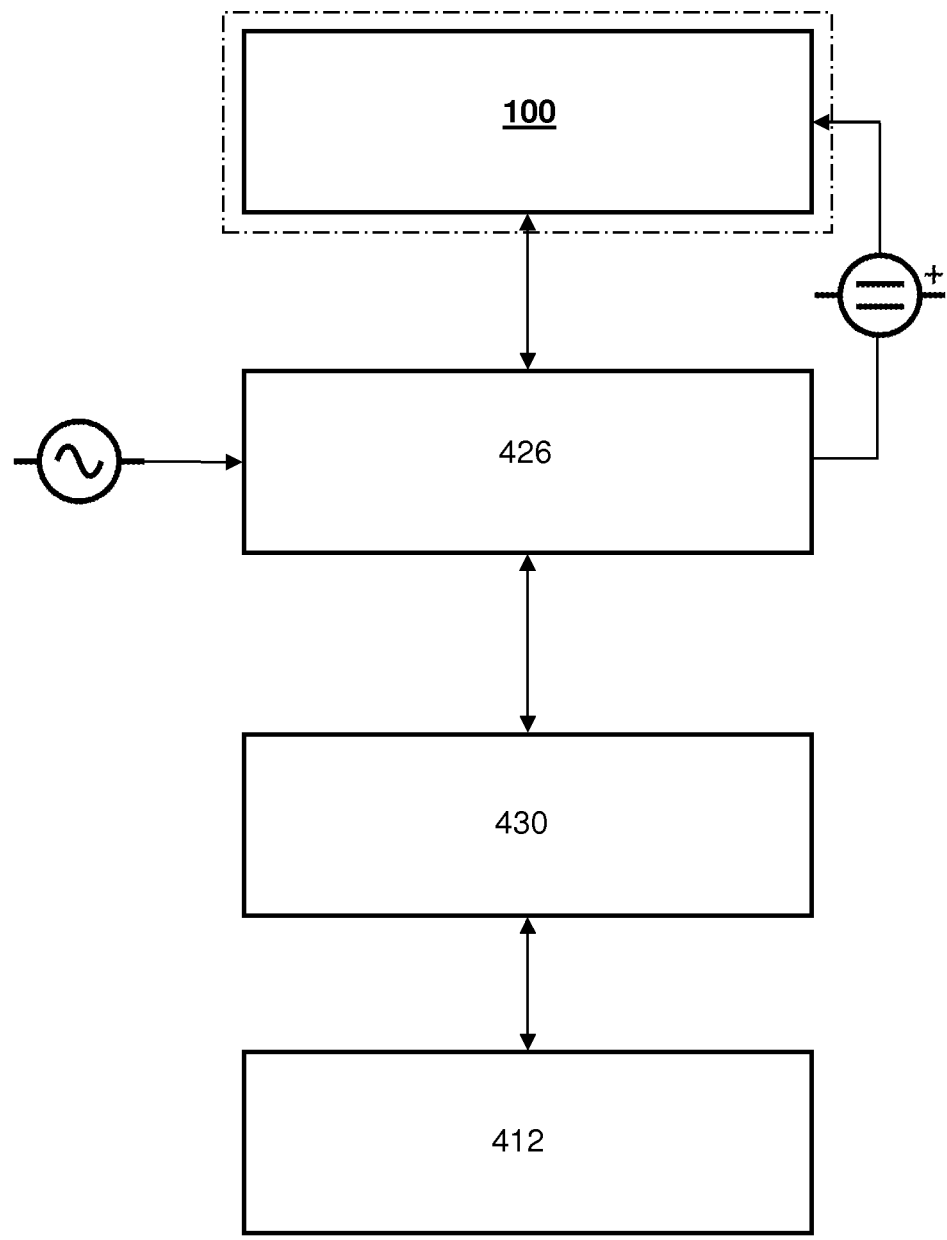
FIG. 7 shows a block diagram of the system architecture of the mass data storage computer connected to the data cradle of the data storage system at the ground control station.

The post sortie download operation will now be described with reference to FIGS. 5 to 7. After the return of the UAV 10 to the ground control station 410, the filled mass data storage computer 100 is removed from the data transfer system 20 of the UAV 10 and a replacement mass data storage computer is installed to the UAV 10 for a new mission. The filled mass data storage computer 100 is then connected to a cradle 426 of the data storage system at the ground control station for download. The cradle 426 ideally includes an interface electrically and mechanically identical to that on the data transfer system 20 of the UAV, a power source, cooling arrangements and network connections 430. Once mounted in the cradle 426, the data 428 stored on the mass data storage computer 100 is downloaded to an external storage module 418. The cradle 426 provides a mechanism to allow the mass data storage computer 100 to be interfaced with the ground control station equipment. The cradle 426 is directly coupled to an image manager 412 by a direct network connection. The image manager 412 is in communication with the external storage module 418, the map display 414 and image display 416 of the ground control station 410 thereby downloading the image data without having to compress it.

In operation, the image manager 412 is capable of automatically detecting a physical connection with the mass data storage computer 100. This causes the image manager 412 to connect to the store manager 406 and requests the geolocated image footprints to be downloaded. After receiving the image footprints, the image manager 412 requests the uncompressed image data associated with each geolocated image footprint and stores the uncompressed image data in local storage module 418. After downloading all data, the mass data storage computer 100 is formatted for its next mission by erasing all data from the device.

Figure 8:
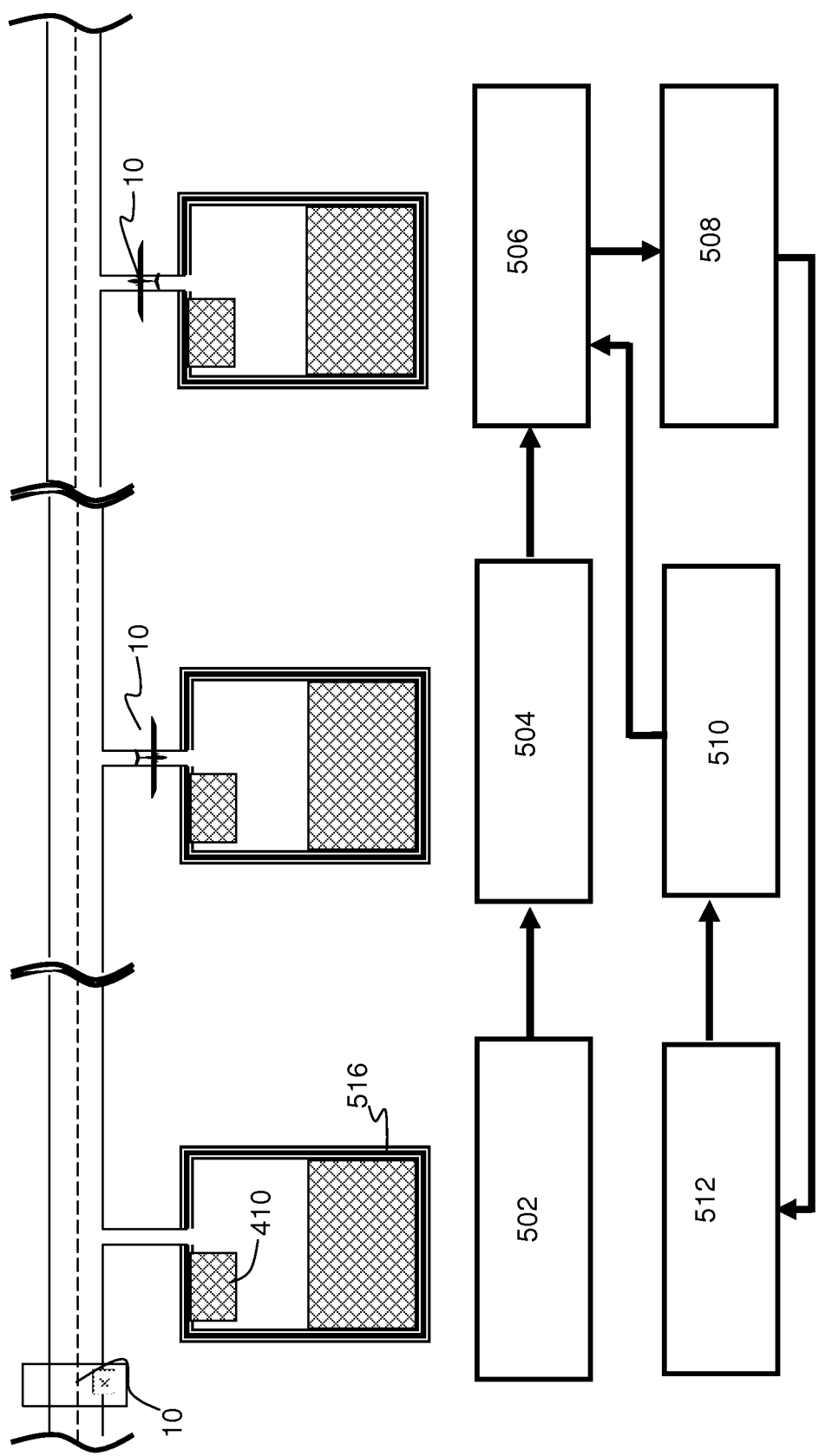
FIG. 8 shows a flow diagram for the management of the data flow, in accordance with an embodiment of the present invention.

A typical UAV 10 landing and data extraction procedure is described in a step-by-step sequence with reference to FIG. 8. The UAV 10 lands (step 502) on the runway 514 and taxies (step 504) to the entrance of a hanger 516. The mass data storage computer 100 is removed (step 506) and a "clean", newly primed mass data storage computer 100 is fitted (step 510) to the UAV 10. The UAV 10 is then refueled and readied for the next mission (step 506). The mass data storage computer 100 that was removed is taken to the data storage system (step 508) at the ground control station 410, where it is fitted to the cradle 426 for data download formatting and data deletion (step 512).

In summary, the mass data storage computer 100 of the present invention allows for a reduced workload in aircraft servicing and reduced vehicle operator personnel. The time for the UAVs 10 to be prepared for the next mission is minimised. The risk of airfield obstruction is also minimised and there are reduced environmental impacts. More importantly, the improved data transfer, either selectively while still on a mission, or through physical exchange of the mass data storage computers 100, allows critical data to be provided in a more efficient and flexible manner.

It is clear that any other types of autonomous vehicle suitable for unmanned or manned operations may be used instead of the UAV. Examples include unmanned ground vehicles (UGV) or unmanned underwater vehicles. The described system may be used for transfer of data beyond the scope described above. For example, the system may be adapted to use with video data and 'black box' data. Also, the mass data storage computer 100 may be used to download mission data such as a predetermined flight path and specific locations for image capture. The mission path of the UAV 10 may be adjusted or updated by sending relevant instructions to the UAV 10 via the wireless transceiver 104, 408, based on the download data.

It will be appreciated that the above embodiment has been described by way of example only and not in any limitative sense, and that various alterations and modifications are possible without departing from the scope of the invention as defined by the appended claims. The various functions described above could be implemented by software, hardware or a combination thereof. For example, software modules for specific functions may be replaced by hardware able to perform such function and vice versa.

What is claimed is:

1. A data transfer system for an unmanned vehicle on a mission, the data transfer system comprising:
    a first sensor on the unmanned vehicle and for collecting a first data set;
    a second sensor on the unmanned vehicle and for collecting a second data set, wherein the second data set is associated with the first data set by a predetermined association;
    a transceiver for transmitting data from the unmanned vehicle to a remote data storage system; and
    a mass data storage computer located on the unmanned vehicle for storing the first and second data sets based on the predetermined association;
    wherein the mass data storage computer is configured to receive and execute requests from the remote data storage system to transmit the first data set from the unmanned vehicle to the remote data storage system;
    wherein the mass data storage computer is configured to receive and execute requests from said remote data storage system to transmit only selected ones of the second data set from the unmanned vehicle to the remote data storage system; and
    wherein the mass data storage computer is configured to be removably connectable to the unmanned vehicle such that at and end of the mission the mass data storage computer can be removed from the unmanned vehicle and connected to the remote data storage device through a data cradle to download any data which has not already been transmitted;
    whereby a time to prepare the unmanned vehicle for a next mission is reduced.

2. The data transfer system according to claim 1, wherein the transceiver is configured to provide a wireless data transfer link to the remote data storage system.

3. The data transfer system according to claim 1, wherein the predetermined association is based on a uniquely assigned tag.

4. The data transfer system according to claim 1, wherein the predetermined association is chronological.

5. The data transfer system according to claim 1, wherein the mass data storage computer comprises:
    a physical interface connector configured to connect to both an unmanned vehicle and to the remote data storage system through the data cradle at the remote data storage system;
    the data cradle comprising an interface electrically and mechanically compatible to that on the data transfer system of the unmanned vehicle, a power source, cooling arrangements, and network connections.

6. The data transfer system according to claim 1, wherein the mass data storage computer is configured to compress the first data set and/or only the selected ones of the second data set prior to transmission via the transceiver.

7. The data transfer system according to claim 1, wherein the first data set comprises:
    geolocation data, and the second data set comprises image data.

8. The data transfer system according to claim 7, wherein the geolocation data comprises:
    real-time tracking data of the unmanned vehicle and an orientation of the second sensor with respect to the unmanned vehicle.

9. The data transfer system according to claim 1, wherein the first sensor comprises:
    a global positioning system and/or an inertial navigation system.

10. The data transfer system according to claim 1, wherein the second sensor comprises:
    a camera for capturing images and/or video.

11. The system of claim 1, wherein the mass data storage computer comprises:
    a power supply unit connected to
    a power connector via
    a backplane;
    a solid state disk;

a controller;
each coupled to a solid state disk board;
the solid state disk board is connected to a backplane;
a single board computer comprising a processor, a memory, a bridge, and
a network controller;
the bridge and the network controller being connected to the backplane;
the backplane connecting to a network connector adapted to connect to a network switch;
wherein the mass data storage computer is connected to a signal concentrator by the network switch.

12. The system of claim 1, wherein the unmanned vehicle is an unmanned aerial vehicle.

13. A method of extracting data from the data transfer system of an unmanned vehicle on a mission, comprising:
providing a data transfer system comprising a first sensor for collecting a first data set and a second sensor for collecting a second data set on the unmanned vehicle, a transceiver for transmitting data from the unmanned vehicle to a remote data storage system, and a mass data storage computer;
(i) receiving the first data set and the second data set and associating the second data set to the first data set according to a predetermined association;
(ii) storing the first data set and the associated second data set in the mass data storage computer;
(iii) receiving and executing requests from the remote data storage system and transmitting the first data set to the remote data storage system via a transceiver;
(iv) receiving and executing requests from the remote data storage system and transmitting only selected ones of the second data set to the remote data storage system via the transceiver; and
(v) at an end of the mission, removing the mass data storage computer from the unmanned vehicle and connecting the mass data storage computer to the remote data storage system via a physical interface data cradle connection and downloading data which has not already been transmitted;
whereby a time to prepare the unmanned vehicle for a next mission is reduced.

14. The method according to claim 13, wherein the predetermined association is based on a uniquely assigned tag.

15. The method according to claim 13, wherein the predetermined association is chronological.

16. The method according to claim 13, comprising:
compressing the first data set and/or only the selected ones of the second data set prior to transmission via the transceiver.

17. The method according to claim 13, comprising:
providing updated mission control data to the unmanned vehicle via the transceiver.

18. The method according to claim 13, comprising:
connecting a second, formatted mass data storage computer to the unmanned vehicle in place of a removed mass data storage computer.

19. The method of claim 13, wherein after review of footprints, a request for a wireless download of compressed specific images pre-selected from mapped geolocated image footprints is made.

20. A non-transitory computer readable storage medium storing a program of instructions for a computer, wherein the instructions when executed by one or more processors carry out the steps of a method comprising:
(i) receiving a first data set and a second data set and associating the second data set to the first data set according to a predetermined association;
(ii) storing the first data set and the associated second data set in a mass data storage computer;
(iii) receiving and executing requests from a remote data storage system and transmitting the first data set to the remote data storage system via a transceiver;
(iv) receiving and executing requests from the remote data storage system and transmitting only selected ones of the second data set to the remote data storage system via the transceiver; and
(v) at an end of the mission, removing the mass data storage computer from the unmanned vehicle and connecting the mass data storage computer to the remote data storage system via a physical interface data cradle connection and downloading data which has not already been transmitted;
whereby a time to prepare the unmanned vehicle for a next mission is reduced.

* * * * *